(12) United States Patent
Sawada et al.

(10) Patent No.: US 8,109,666 B2
(45) Date of Patent: Feb. 7, 2012

(54) LIGHT GUIDING MEMBER AND LINEAR LIGHT SOURCE APPARATUS USING SAME

(75) Inventors: Hideki Sawada, Kyoto (JP); Norihiro Imamura, Kyoto (JP); Motoari Shoji, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 792 days.

(21) Appl. No.: 12/087,614

(22) PCT Filed: Dec. 25, 2006

(86) PCT No.: PCT/JP2006/325731
§ 371 (c)(1),
(2), (4) Date: Jul. 10, 2008

(87) PCT Pub. No.: WO2007/080772
PCT Pub. Date: Jul. 19, 2007

(65) Prior Publication Data
US 2009/0016077 A1 Jan. 15, 2009

(30) Foreign Application Priority Data

Jan. 10, 2006  (JP) ................. 2006-002335
Jan. 10, 2006  (JP) ................. 2006-002336
Feb. 15, 2006  (JP) ................. 2006-038327

(51) Int. Cl.
*F21V 7/04* (2006.01)
(52) U.S. Cl. ........ 362/628; 362/615; 362/616; 362/617; 362/618; 362/619; 362/620; 362/621; 362/622; 362/623; 362/624; 362/625; 362/626; 362/627; 362/629; 362/612

(58) Field of Classification Search ........... 362/600–634
See application file for complete search history.

(56) References Cited

U.S. PATENT DOCUMENTS 5,584,556 A * 12/1996 Yokoyama et al. ........... 362/625
5,835,661 A   11/1998 Tai et al.
5,845,038 A   12/1998 Lundin et al.
(Continued)

FOREIGN PATENT DOCUMENTS
JP      5-142538      6/1993
(Continued)

OTHER PUBLICATIONS

Co-pending U.S. Appl. No. 12/217,969 entitled "Linear Light Source Device", filed Jul. 10, 2008.

*Primary Examiner* — William Carter
(74) *Attorney, Agent, or Firm* — Hamre, Schumann, Mueller & Larson, P.C.

(57) ABSTRACT

A light guide member of the present invention is made of a light transmitting material. The light guide includes a light emitting surface 13, which extends in direction x and includes a lens surface 31 for converging light in direction y. The light guide also includes a light incident surface 11 provided at one of the ends spaced from each other in the direction x. The light emitting surface 13 includes a transitional region 13a adjacent to the light incident surface 11, where the transitional region includes the lens surface 31 and a round pillar surface 32. In the transitional region 13a, the lens surface 31 becomes less dominant in area as proceeding in the direction x toward the light incident surface 11.

13 Claims, 14 Drawing Sheets

U.S. PATENT DOCUMENTS

| | | |
|---|---|---|
| 5,926,601 A | 7/1999 | Tai et al. |
| 6,083,607 A | 7/2000 | Mimura et al. |
| 6,259,082 B1 * | 7/2001 | Fujimoto et al. ........... 250/208.1 |
| 6,351,594 B1 | 2/2002 | Nakamura et al. |
| 6,379,016 B1 * | 4/2002 | Boyd et al. ................... 362/625 |
| 6,426,807 B1 * | 7/2002 | Kawai et al. .................. 362/800 |
| 6,880,945 B2 | 4/2005 | Knaack et al. |
| 6,910,783 B2 | 6/2005 | Mezei et al. |
| 7,125,151 B2 | 10/2006 | Uemura et al. |
| 7,308,187 B2 * | 12/2007 | Saito et al. ................... 385/147 |
| 7,478,936 B2 | 1/2009 | Chen |
| 7,611,271 B2 | 11/2009 | Meis et al. |
| 2002/0015193 A1 | 2/2002 | Tabata |
| 2003/0219207 A1 | 11/2003 | Guy |
| 2006/0146573 A1 | 7/2006 | Iwauchi et al. |
| 2007/0091642 A1 | 4/2007 | Lee et al. |

FOREIGN PATENT DOCUMENTS

| | | |
|---|---|---|
| JP | 9-200439 | 7/1997 |
| JP | 10-112782 | 4/1998 |
| JP | 11-215302 | 8/1999 |
| JP | 2001-343531 | 12/2001 |
| JP | 2003-346509 | 12/2003 |
| JP | 2004-56425 | 2/2004 |
| JP | 2004-312753 | 11/2004 |
| WO | WO 98/18028 | 4/1998 |

* cited by examiner

D/R=0.17

D/R=0.33

D/R=0.50

D/R=0.67

LIGHT GUIDING MEMBER AND LINEAR LIGHT SOURCE APPARATUS USING SAME

TECHNICAL FIELD

The present invention relates to a light guide member used for an image reading apparatus such as a scanner, a facsimile machine and a printer. The present invention also relates to a linear light source device using a light guide member.

BACKGROUND ART

In an image reading apparatus, a document is irradiated with light and the light reflected by the document is received, whereby the image printed in the document is converted into electrical signals. In such an image reading apparatus, a linear light source device capable of emitting linearly extended light is often used as the light source to irradiate the document.

FIGS. 24 and 25 show an example of conventional linear light source device. The linear light source device X shown in the figures includes two light sources 91 and a light guide member 92. Each of the light sources 91 includes three LEDs 91a for blue light, green light and red light. The light guide member 92 is made of a light transmitting material such as acrylic resin. The light guide member 92 is elongated in the right and left direction in FIG. 24. The light guide member 92 includes two light incident surfaces 92a, a reflecting portion 92b and a light emitting surface 92c. The two light incident surfaces 92a are positioned at longitudinally opposite ends of the light guide member 92. The light sources 91 are disposed in front of the respective light incident surfaces 92a. The reflecting portion 92b is provided on the lower surface of the light guide member 92. The light emitting surface 92c is provided on the upper surface of the light guide member 92. The light emitting surface 92c is elongated in the longitudinal direction of the light guide member 92 and is arcuate in cross section.

The light emitted from the light sources 91 enters the light guide member 92 through the light incident surfaces 92a. The light traveling in the longitudinal direction of the light guide member is reflected upward by the reflecting portion 92b. The light emitting surface 92c increases the directivity of the light reflected by the reflecting portion 92b to form linear light. The linear light is emitted upward to irradiate the document which is the target of image reading by the image reading apparatus.

In the linear light source device X, however, the brightness of the emitted light may not be uniform in the longitudinal direction. Specifically, the brightness distribution in the longitudinal direction depends on the amount of light reflected by the reflecting portion 92 in the process of traveling within the light guide member 92 in the longitudinal direction after being emitted from the light source 91. For instance, light with a relatively high brightness is likely to be emitted from a portion of the light emitting surface 92c which is close to the light source 91. Thus, the document is not irradiated uniformly, and hence, may not be read properly by the image reading apparatus.

Patent Document 1: JP-A-H9-200439

DISCLOSURE OF THE INVENTION

The present invention is proposed under the circumstances described above. It is therefore an object of the present invention to provide a light guide member and a linear light source device which achieve uniform brightness of the linear light.

According to a first aspect of the present invention, there is provided a light guide member made of a light transmitting material. The light guide member comprises: a light emitting surface extending in a first direction and including a convex surface for converging light in a second direction perpendicular to the first direction; and a light incident surface positioned at an end in the first direction. The light emitting surface includes a transitional region adjacent to the light incident surface, where the transitional region includes the convex surface and a non-convex surface. In the transitional region, the convex surface becomes less dominant in area as proceeding in the first direction toward the light incident surface.

Preferably, the non-convex surface may be part of a surface of a column having a central axis extending in the second direction.

Preferably, the light guide member may further comprise a plurality of grooves formed at a portion opposite to the light emitting surface, where the grooves are spaced from each other in the first direction and each extend in the second direction.

Preferably, each of the grooves may be a columnar groove with a central axis extending in the second direction and may have a radius R and a depth D that satisfy $D/R \leq 0.5$.

Preferably, the plurality of grooves may include two adjacent grooves that differ from each other in D/R, the D/R of one of the two adjacent grooves which is farther from the light incident surface being greater than the D/R of the other one of the two adjacent grooves which is closer to the light incident surface.

Preferably, the light guide member may include another end in the first direction, and this end may comprise a plurality of surfaces including a pair of inclined surfaces, where the paired inclined surfaces are mirror symmetrical with respect to a plane of symmetry extending in the first direction.

Preferably, the plurality of surfaces may include two pairs of inclined surfaces, and the inclined surfaces in each pair may be mirror symmetrical with respect to a respective one of two planes of symmetry extending in the first direction.

Preferably, the two planes of symmetry for the two pairs of inclined surfaces may extend perpendicularly to each other.

Preferably, the light guide member of the present invention may further comprise a grained surface provided between the paired inclined surfaces in a manner such that the grained surface is perpendicular to the plane of symmetry.

According to a second aspect of the present invention, there is provided a linear light source device comprising: a light guide member according to the first aspect of the present invention; and a light source facing the light incident surface.

Preferably, the light source may include a plurality of LED elements that are aligned along a light emission direction of the light emitting surface, where the light emission direction is perpendicular to both the first direction and the second direction.

Preferably, the LED elements may emit light of different wavelengths, and at least part of the light incident surface may be a rough surface.

Preferably, the rough surface of the light incident surface may be provided at a portion opposite to the light emitting surface.

Preferably, the LED elements may include a blue LED element for blue light, a green LED element for green light and a red LED element for red light, where these three LED elements are arranged in a manner such that the blue LED element, the green LED element and the red LED element become further in this order from the light emitting surface.

Preferably, the rough surface in the light incident surface may face at least the red LED element.

Preferably, the rough surface in the light incident surface may further face the green LED element.

Preferably, the light guide member may include a surface that is opposite to the light emitting surface and provided with a rough portion adjacent to the light incident surface.

BEST MODE FOR CARRYING OUT THE INVENTION

Preferred embodiments of the present invention will be described below with reference to the accompanying drawings.

Figure 1:
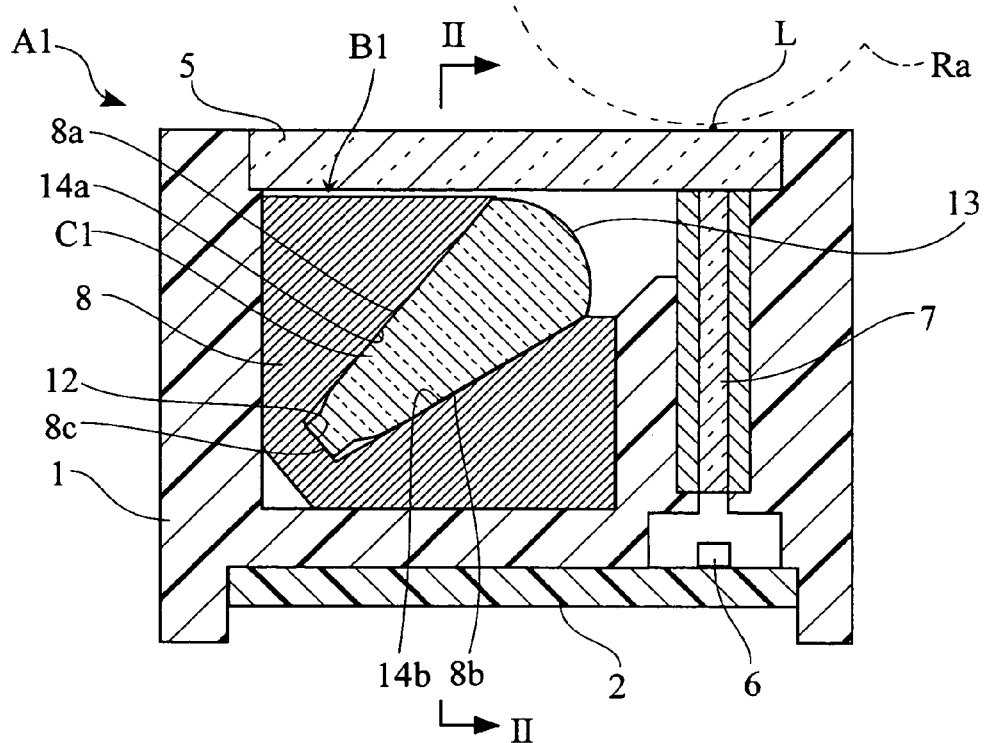
FIG. 1 is a sectional view showing an image reading apparatus provided with a linear light source device including a light guide member according to a first embodiment of the present invention.
Figure 2:
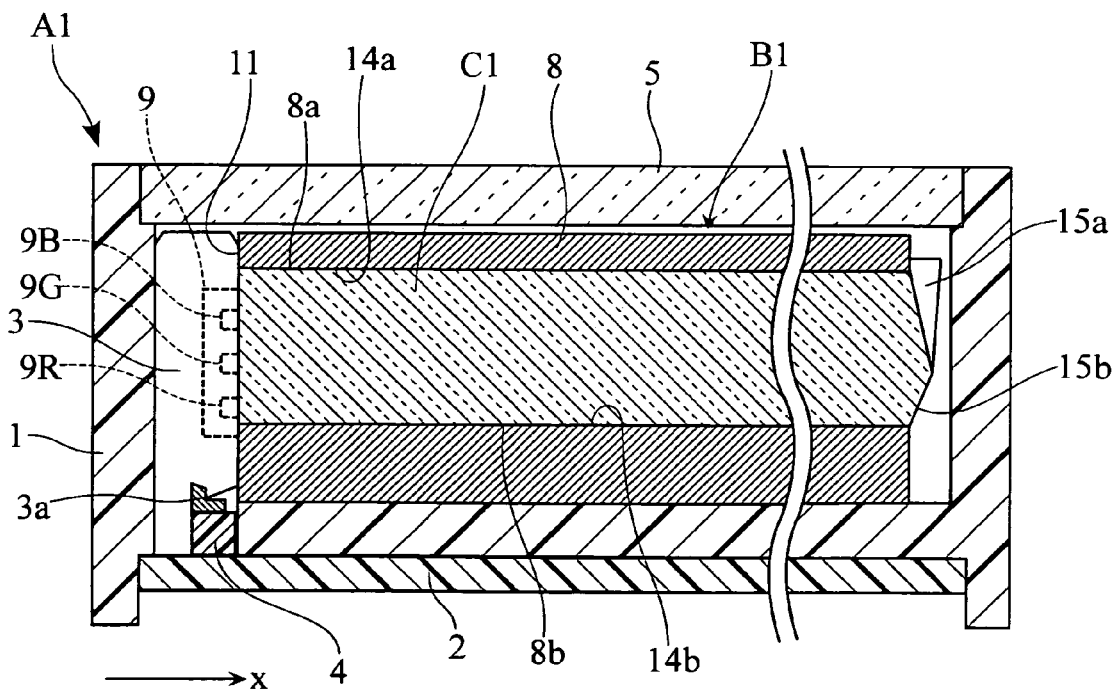
FIG. 2 is a sectional view taken along lines II-II in FIG. 1.

FIG. 1 is a sectional view showing an image reading apparatus provided with a linear light source device including a light guide member according to a first embodiment of the present invention. FIG. 2 is a sectional view taken along lines II-II in FIG. 1. The direction from left to right in FIG. 2 is direction x.

As shown in FIGS. 1 and 2, the image reading apparatus A1 includes a linear light source device B1, a case 1, a substrate 2, a package 3, a rubber connector 4, a glass cover 5, light receiving elements 6, a lens array 7 and a reflection member 8. The image reading apparatus A1 reads a document on a read line L (see FIG. 1) extending longitudinally in the direction x. In the image reading apparatus A1, the document to be read (not shown) is irradiated with the light emitted from the linear light source device B1, and the reflected light is received by the light receiving elements 6, whereby the content of the document as an image is converted into electrical signals.

The case 1 is made of e.g. a synthetic resin. The case 1 is in the form of a box elongated in the direction x. The case 1 is open at the almost entire upper surface portion. The case 1 is open also at the bottom. The case 1 accommodates the main parts of the image reading apparatus A1.

The substrate 2 is made of e.g. epoxy resin or a ceramic material. The substrate 2 is fitted in the bottom of the case 1. The light receiving elements 6 and the rubber connector 4 are mounted on the substrate 2. Though not illustrated, the substrate 2 is formed with a wiring pattern for mounting the light receiving elements 6 and the rubber connector 4. A connector terminal for connecting the wiring pattern to an external controlling device (not shown) is mounted on the substrate 2.

The package 3 accommodates a light source 9. The package 3 is provided with a group of terminals 3a. The group of terminals 3a are connected to the LEDs (which will be described later) of the light source 9. The terminals 3a are electrically connected to a wiring pattern (not shown) on the substrate 2 via the rubber connector 4.

The rubber connector 4 establishes electrical connection between e.g. the wiring pattern and the terminals 3a of the package 3. The rubber connector 4 comprises a rubber case incorporating a conductive member (not shown). The rubber connector 4 is pressed into the space between the light source 9 and the substrate 2.

The glass cover 5 is made of transparent glass. The glass cover 5 is fitted in the opening at the top of the case 1. The document to be read is placed on the glass cover 5.

The light receiving elements 6 are disposed on the substrate 2 to be aligned in the direction x. The light receiving elements 6 convert the received light into electrical energy and output the energy as electrical signals through the wiring pattern.

The lens array 7 causes the light reflected by the document on the read line L to converge onto the light receiving elements 6. For instance, the lens array 7 is made up of a large number of Selfoc lenses aligned in the direction x and capable of forming a real-size erect image of the document.

Figure 3:
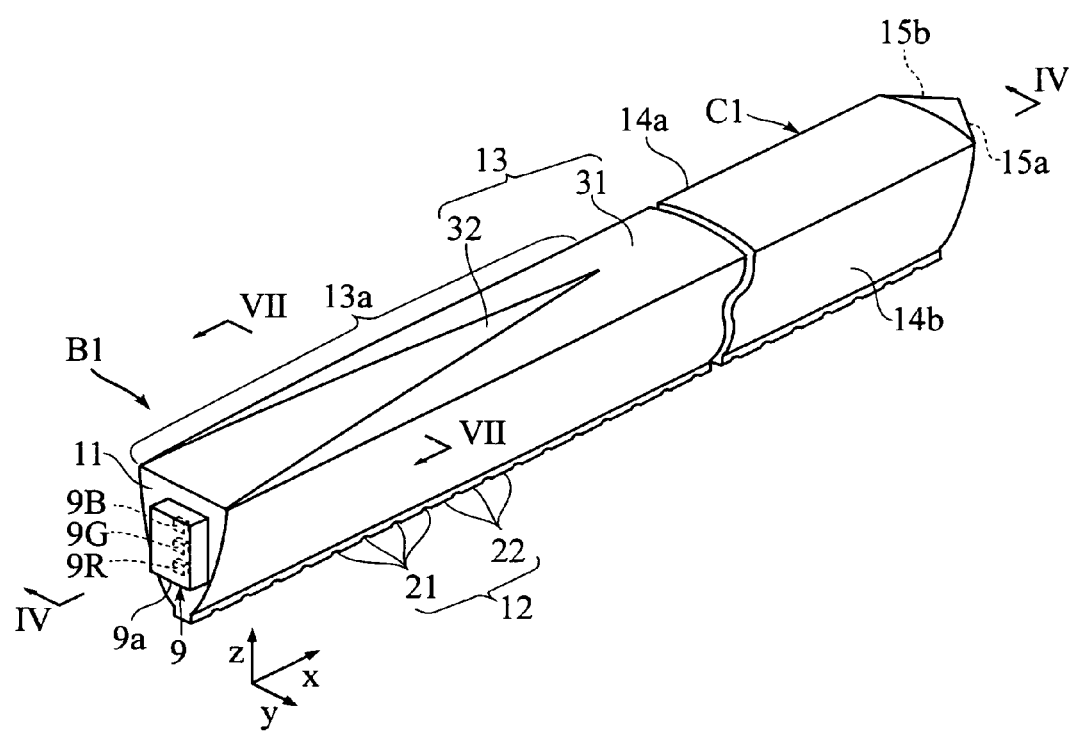
FIG. 3 is an overall perspective view of the linear light source device.
Figure 4:
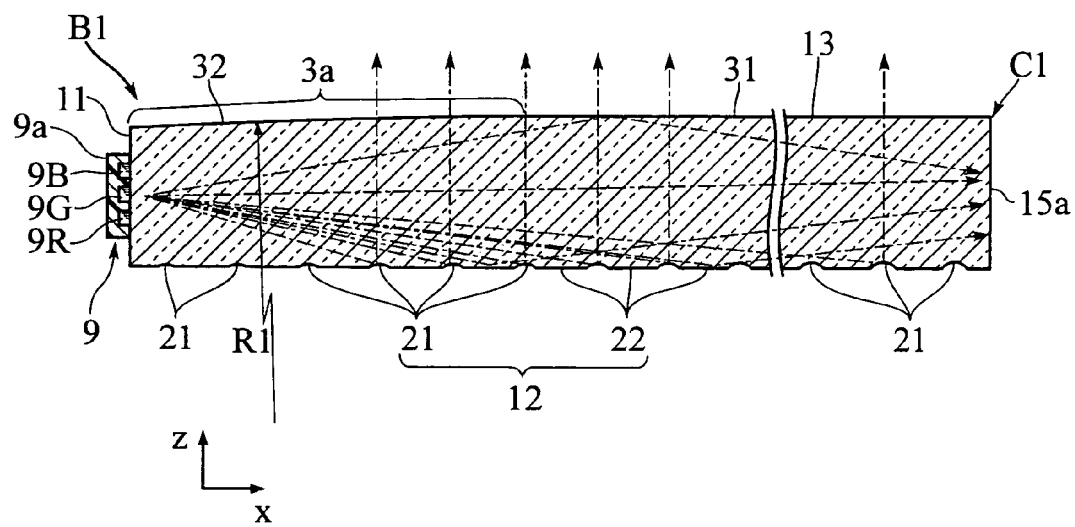
FIG. 4 is a sectional view taken along lines II-II in FIG. 3.

FIG. 3 is an overall perspective view of the linear light source device. FIG. 4 is a sectional view taken along lines II-II in FIG. 3. The linear light source device B1 comprises a light guide member C1 and the light source 9. The linear light source device B1 emits linear light in the upward direction in FIG. 3. Thus, the linear light source device B1 irradiates the read line L with light. The direction x and the direction y in these figures correspond to the first direction and the second direction in the present invention, respectively. The direction z is a direction that is perpendicular to both the direction x and the direction y. The direction z is the light emission direction in which linear light is emitted from the light guide member C1.

The light guide member C1 is made of e.g. transparent acrylic resin such as PMMA (polymethyl methacrylate). The light guide member C1 has an elongated shape having a predetermined dimension in the direction x.

The light guide member C1 includes a light incident surface 11, a light reflecting surface 12, a light emitting surface 13, side surfaces 14a and 14b, and inclined surfaces 15a and 15b. The light guide member C1 has a dimension of about 228 mm in the direction x, a maximum dimension of about 3 mm in the direction y, and a dimension of about 6.4 mm in the direction Z.

The light from the light source 9 enters the light guide member C1 through the light incident surface 11. The light incident surface 11 is provided at an end of the light guide member c1 in the direction x. The light incident surface 11 is mirror-finished to be smooth.

The light reflecting surface 12 is provided at the lower end of the light guide member C1. The light reflecting surface 12 is made up of a plurality of grooves 21 and a plurality of planes 22. Each of the grooves 21 has a shape like that obtained by removing part of a column having a central axis extending in the direction x. The grooves 21 are spaced from each other by a predetermined distance in the direction x. Each of the planes 22 is positioned between adjacent grooves 21. As shown in FIG. 4, part of the light entering through the light incident surface 11 is reflected by the grooves 21 in the direction z. Of the light entering through the light incident surface 11 and reaching the light reflecting surface 12, the part which is not reflected by the grooves 21 is reflected by the planes 22 to travel within the light guide member C1 in the direction x.

Figure 5:
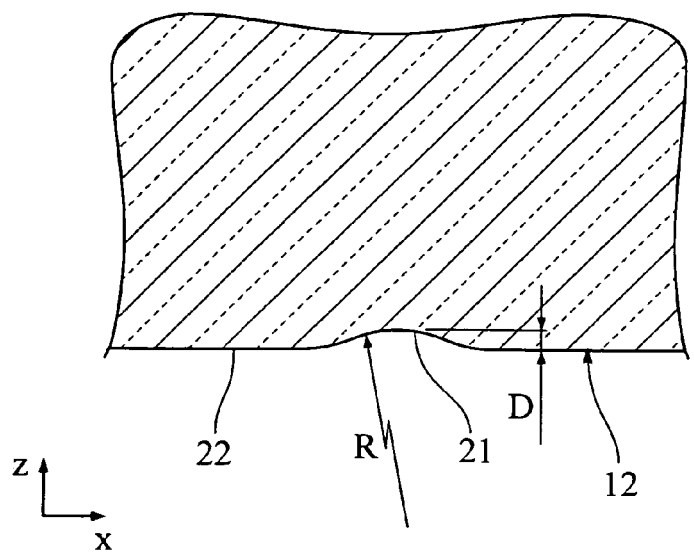
FIG. 5 is an enlarged sectional view showing an example of groove of the light guide member.
Figure 6:
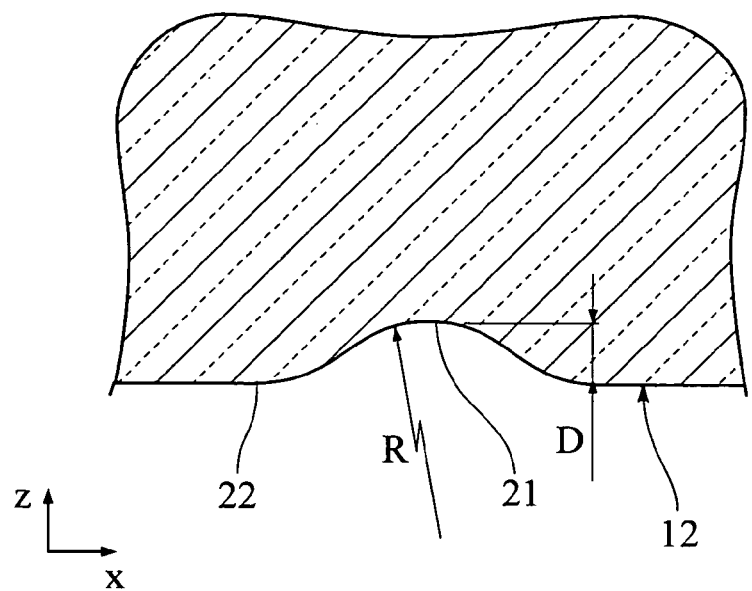
FIG. 6 is an enlarged sectional view showing an example of groove of the light guide member.

FIG. 5 is a sectional view of the leftmost one of the grooves 21 shown in FIG. 4. FIG. 6 is a sectional view of the rightmost one of the grooves 21 shown in FIG. 4. The dimensions of each groove 21 is so determined that the ratio of depth D/radius R be not more than 1/2 (where R is the distance from the central axis of the column to the surface of the groove when the surface of the groove 21 is regarded as part of the side surface of the column). Among two adjacent grooves 21, the ratio D/R of one groove which is farther from the light incident surface 11 is greater than that of the other one groove which is closer to the light incident surface 11, although there are some exceptions.

The depth D and the ratio D/R of the grooves 21 of this embodiment are given in Table 1. The "groove No." in Table 1 is a serial number given to each of the grooves 21. A groove which is closer to the right end in FIG. 4 has a larger groove number. Specifically, the light guide member C1 is formed with 228 grooves 21 at the pitch of 1 mm. All the grooves 21 have the same radius R of 0.3 mm. The groove 21 with the groove No. 1 shown in FIG. 5 has a radius R of 0.3 mm and a depth D of 0.045 mm. Thus, the ratio D/R of this groove 21 is 0.15.

TABLE 1

| Groove No. | Groove Depth D [mm] | D/R |
| --- | --- | --- |
| 1~5 | 0.045 | 0.150 |
| 6~10 | 0.050 | 0.167 |
| 11~20 | 0.053 | 0.177 |
| 21~30 | 0.056 | 0.187 |
| 31~40 | 0.056 | 0.187 |
| 41~50 | 0.056 | 0.187 |
| 51~60 | 0.058 | 0.193 |

TABLE 1-continued

| Groove No. | Groove Depth D [mm] | D/R |
| --- | --- | --- |
| 61~70 | 0.061 | 0.203 |
| 71~80 | 0.066 | 0.220 |
| 81~90 | 0.072 | 0.240 |
| 91~100 | 0.077 | 0.257 |
| 101~110 | 0.083 | 0.277 |
| 111~120 | 0.089 | 0.297 |
| 121~130 | 0.096 | 0.320 |
| 131~140 | 0.104 | 0.347 |
| 141~150 | 0.112 | 0.373 |
| 151~160 | 0.120 | 0.400 |
| 161~170 | 0.130 | 0.433 |
| 171~180 | 0.140 | 0.467 |
| 181~190 | 0.150 | 0.500 |
| 191~200 | 0.150 | 0.500 |
| 201~210 | 0.148 | 0.493 |
| 211~220 | 0.144 | 0.480 |
| 221~228 | 0.140 | 0.467 |

The groove 21 with the groove No. 228 shown in FIG. 6 has a radius R of 0.3 mm and a depth D of 0.14 mm. Thus, the ratio D/R of this groove 21 is about 0.47. As shown in Table 1, the grooves 21 are divided into a plurality of groups each consisting of e.g. five to ten adjacent grooves 21 having an equal depth D. The difference in depth D between adjacent groups of the grooves 21 is about 0.1 mm at the maximum.

Figure 7:
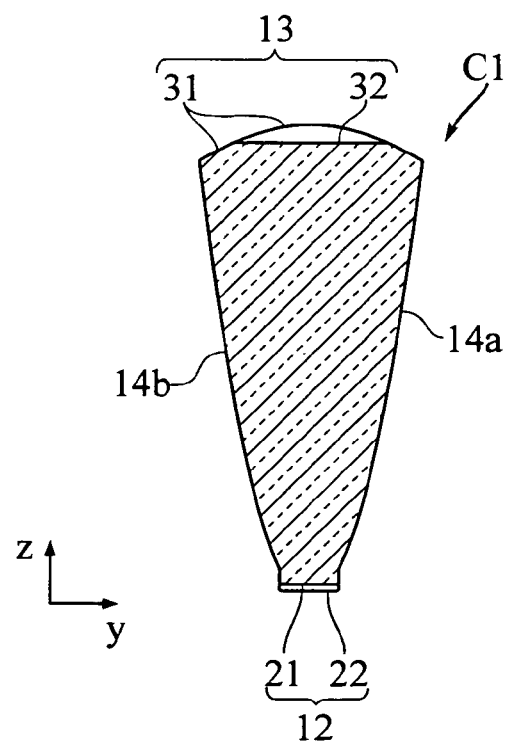
FIG. 7 is a sectional view taken along liens VII-VII in FIG. 3.

As shown in FIG. 3, the light emitting surface 13 is elongated in the direction x. The light emitting surface 13 emits linear light. The light emitting surface 13 includes a lens surface 31 and a round pillar surface 32. As shown in FIG. 7, the cross section of the lens surface 31 in the yz plane has an arcuate shape bulging in the direction z. The lens surface 31 corresponds to the convex surface in the present invention. The light traveling from the reflecting surface 12 in the direction z is converged by the lens surface 31 in the direction y. As a result, light with an enhanced directivity is emitted from the lens surface 31.

As shown in FIG. 4, the round pillar surface 32 comprises part of the side surface of a column having a central axis extending in the direction y. As shown in FIG. 3, the round pillar surface 32 is generally in the form of an isosceles triangle as viewed in the direction z. As shown in FIG. 7, the cross section of the round pillar surface 32 in the yz plane is straight. Thus, unlike the lens surface 31, the round pillar surface 32 does not exhibit the light converging effect in the direction y. The round pillar surface 32 is provided in the light emitting surface 13 at a position offset to the light incident surface 11. The round pillar surface 32 has a radius R1 (see FIG. 4) of about 400 mm and a dimension in the direction x of about 19 mm.

In the light emitting surface 13, the region including the round pillar surface 32 in the direction x is transitional region 13a. The portion of the transitional region 13a which adjoins the light incident surface 11 comprises only the round pillar surface 32. In the transitional region 13a, the proportion occupied by the lens surface 31 in the direction y is smaller at a portion farther from the light incident surface 11.

Figure 8:
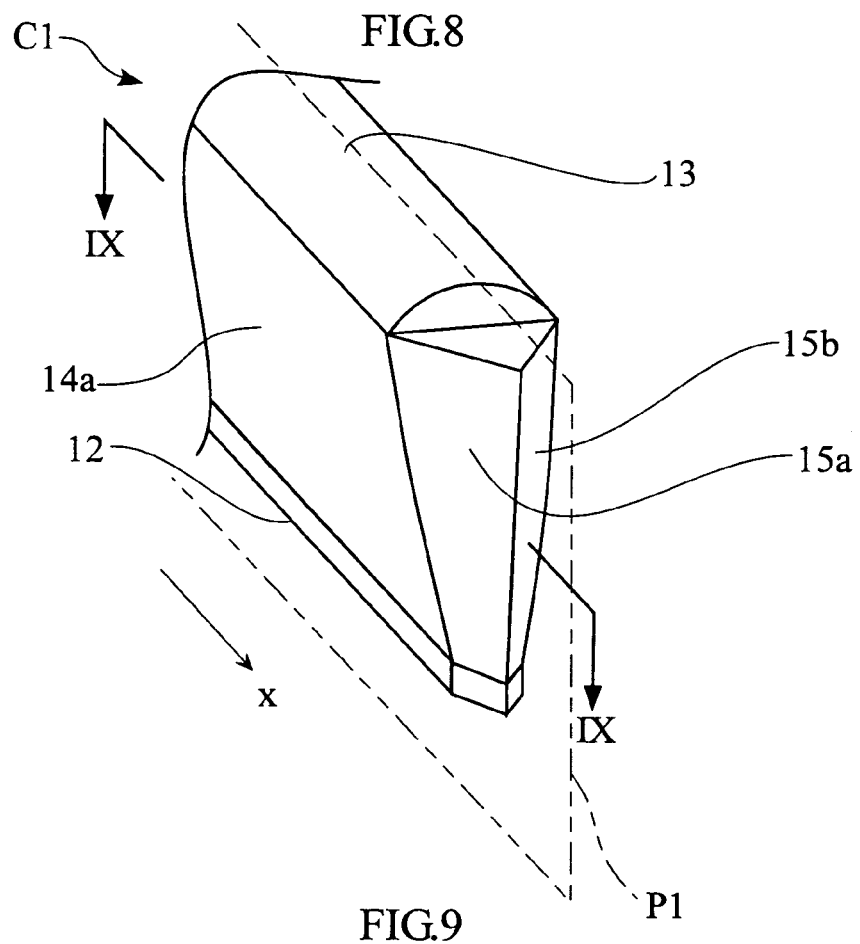
FIG. 8 is a perspective view showing an end of the light guide member.
Figure 9:
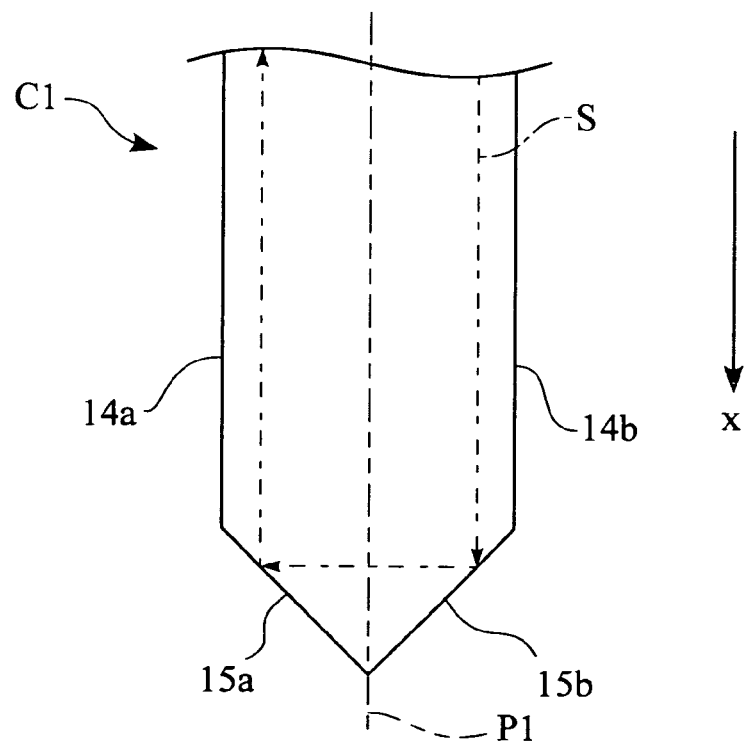
FIG. 9 is a sectional view taken along lines IX-IX in FIG. 8.

FIG. 8 is a perspective view showing an end of the light guide member. FIG. 9 is a sectional view taken along lines IX-IX in FIG. 8. All of the light reflecting surface 12, the light emitting surface 13, the side surfaces 14a and 14b, and the inclined surfaces 15a and 15b are mirror surfaces.

With this arrangement, when light travels within the light guide member C1, the light guide member C1 totally reflects the light impinging on its surfaces at an angle which is larger than the critical angle for total reflection. The light guide member C1 allows the light impinging on its surfaces at an angle which is smaller than the critical angle for total reflection to pass therethrough. For instance, the index of refraction of PMMA is 1.49. Thus, the critical angle in the case where light travels from the light guide member C1 made of PMMA to the outside is about 42.2 degrees.

Of the light entering the light guide member C1 through the light incident surface 11, the light rays traveling straight in the direction x reach the inclined surfaces 15a, 15b. Other light rays impinge obliquely on the light reflecting surface 12, the light emitting surface 13, the side surface 14a and the side surface 14b.

The side surfaces 14a and 14b are paraboloids. Thus, the light diffused at the light reflecting surface 12 is guided by the side surfaces to the light emitting surface 13 to be converged on the read line L. In accordance with the shape of the side surfaces 14a and 14b, the width of the light reflecting surface 12 is made smaller than that of the light emitting surface 13.

As shown in FIG. 8, the inclined surfaces 15a and 15b form an end of the light guide member C1. The inclined surfaces 15a and 15b are paired surfaces intersecting with each other. The inclined surfaces 15a and 15b are mirror symmetrical with respect to the plane of symmetry P1 extending in the direction x (see the phantom lines in FIGS. 8 and 9). The angle formed between the inclined surface 15a and the plane of symmetry P1 is 45 degrees. The angle formed between the inclined surface 15b and the plane of symmetry P1 is also 45 degrees. The inclined surface 15a and the inclined surface 15b have the same shape.

The reflection member 8 (see FIG. 1) is made of e.g. white synthetic resin. The reflection member 8 is accommodated in the case 1. The reflection member 8 serves as a holder of the light guide member C1. The reflection member 8 returns the light leaking out from the light guide member C1 into the light guide member C1. As shown in FIG. 1, the reflection member 8 includes a reflecting surface 8a covering the side surface 14a of the light guide member C1, a reflecting surface 8b covering the side surface 14b of the light guide member and a reflecting surface 8c covering the light reflecting surface 12 of the light guide member. As shown in FIG. 2, the reflection member 8 does hot cover the light incident surface 11 and the light emitting surface 13 of the light guide member C1.

The light source 9 emits visible light. The light source 9 includes a light source case 9a and three LEDs 9B, 9G and 9R for emitting blue light, green light and red light, respectively. The light source case 9a holds the LEDs 9B, 9G and 9R at predetermined positions. The light source case 9a may be made of resin. The light source 9 is so arranged that the light emitting surfaces of the LEDs 9B, 9G and 9R face the light incident surface 11 of the light guide member C1. The LEDs 1B, 1G and 1R emit light of different wavelengths. Due to the provision of the LEDs 9B, 9G and 9R, the linear light source device B1 can emit white light.

With the above-described arrangement, the light rays emitted from the light source 9 enter the light guide member C1 through the light incident surface 11. The light rays entered through the light incident surface 11 travel radially within the light guide member C1 around the light ray traveling in the direction x.

Of these light rays, some of the light rays diffused at the light reflecting surface 12 directly reach the light emitting surface 13, while other light rays reach the light emitting surface 13 after being reflected at the side surface 14a, 14b. Of the light rays reaching the light emitting surface 13, the light rays impinging on the light emitting surface 13 at an angle of incidence which is not larger than 42.2 degrees pass through the light emitting surface to be emitted as linear light toward the read line L by the lens effect of the light emitting surface 13.

The light emitting surface 13 and the light reflecting surface 12 extend to be elongated in the direction x along almost the entire length of the light guide member C1. Thus, the entire length of read line L is irradiated with the linear light.

The image reading apparatus A1 reads the document transferred onto the read line L extending in the direction x by e.g. a pressure roller Ra (see phantom lines in FIG. 1). Specifically, while the image reading apparatus A1 and the document to be read are moved relative to each other in the right and left direction in the figure, the document is irradiated with the linear light emitted from the linear light source device B1. The light reflected by the document is received by the light receiving elements 6 via the lens array 7. In the image reading apparatus A1, electrical signals generated from the light receiving elements 6 are stored in e.g. a non-illustrated memory, whereby the content of the document is read as an image. The image reading apparatus A1 outputs the content of the document in the form of electrical signals.

The advantages of the light guide member C1 and the linear light source device B1 will be described below.

In the light emitting surface 13, the effect of converging light in the direction y varies depending on the positions in the direction x. As shown in FIG. 3, the region other than the transitional region 13a of the light emitting surface 13 comprises the lens surface 31 only. In this region, therefore, light is sufficiently converged in the direction y, so that light with high directivity is emitted from this region of the light emitting surface 13.

On the other hand, part of the transitional region 13a comprises the round pillar surface 32. The round pillar surface 32 does not have the function to converge light in the direction y. Thus, the directivity of the light emitted from the transitional region 13a is relatively low. The directivity of the light emitted decreases as the proportion occupied by the round pillar surface 32 in the direction y increases. That is, in the transitional region 13a, the light emitted from a portion closer to the light incident surface 11 has a lower directivity.

Figure 10:
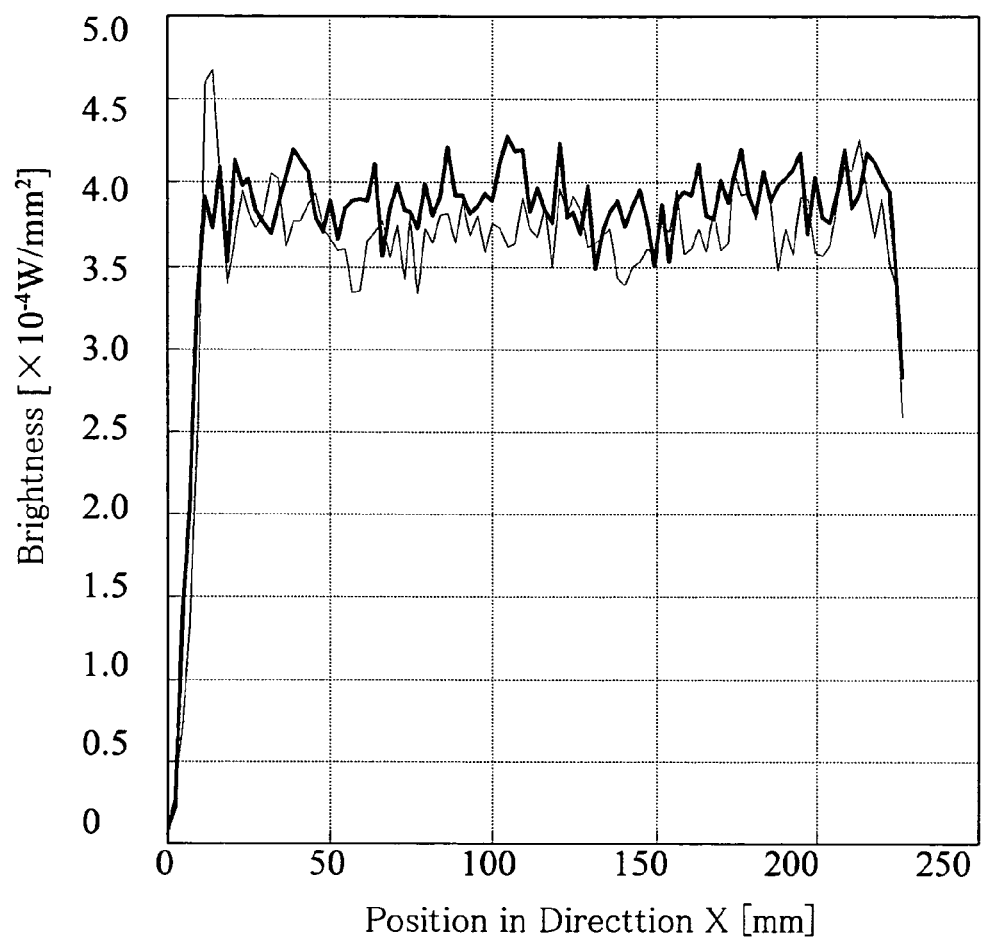
FIG. 10 is a graph showing the brightness distribution of linear light in the linear light source device.

FIG. 10 shows brightness distribution of linear light emitted from the linear light source device B1 and that emitted from another device as a comparative example with respect to the direction x. In FIG. 10, the thick line indicates the brightness distribution of the linear light source device B1, whereas the thin line indicates the brightness distribution of the comparative example. The 0 position in direction x corresponds to the light incident surface 11. The comparative example has the same structure as that of the linear light source device B1 except that its light emitting surface comprises only a lens surface 31 of the linear light source device B1. In the comparative example, the brightness is considerably higher at the portion close to the light incident surface 11 (the portion of about 15 mm position in the direction x) than other portions. This is because light with a relatively high intensity is reflected by a groove 21 located close to the light source 9 and emitted from the light emitting surface 13.

Unlike the comparative example, the brightness distribution of the linear light source device B1 does not include a remarkable peak at portions close to the light incident surface 11. This is because, by the provision of the round pillar surface 32, the light converging effect by the light emitting surface 13 is lower at a portion closer to the light incident surface 11, as described above. In this way, according to the linear light source device B1 employing the light guide member C1, the brightness of the linear light emitted is uniform in the direction x, so that the content of the document is read clearly. Further, by employing the round pillar surface 32 as the non-convex surface in the present invention, the non-convex surface whose dimension in the direction y gradually reduces as proceeding away from the light incident surface 11 is easily formed.

Figure 11:
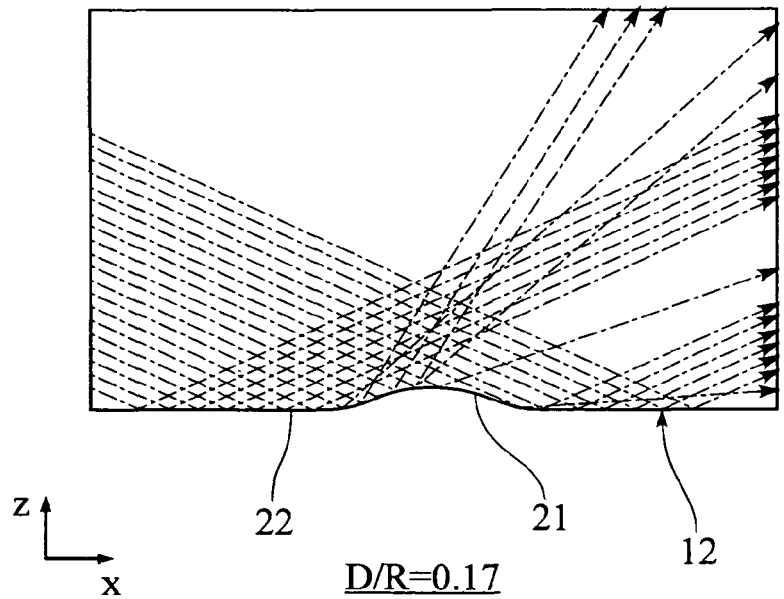
FIG. 11 shows simulation results of light reflection at an example of groove of the light guide member.
Figure 12:
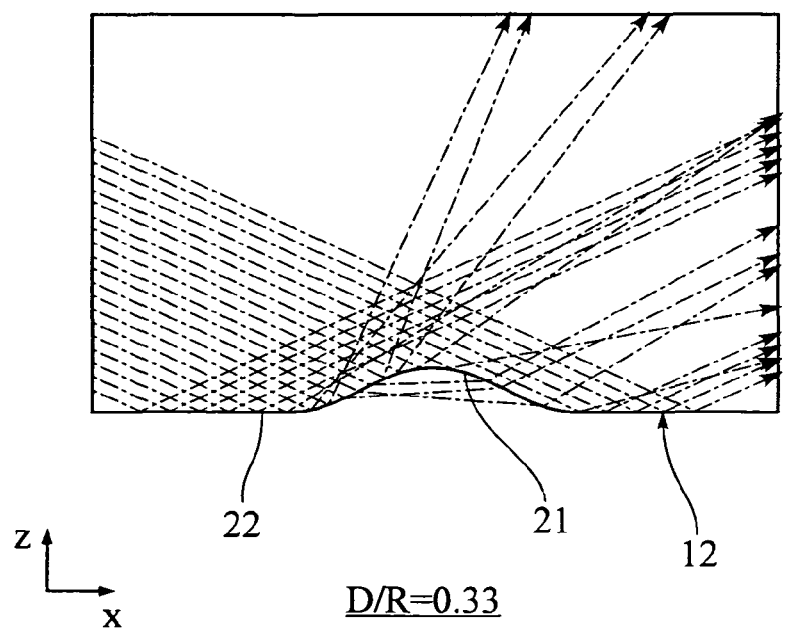
FIG. 12 shows simulation results of light reflection at an example of groove of the light guide member.
Figure 13:
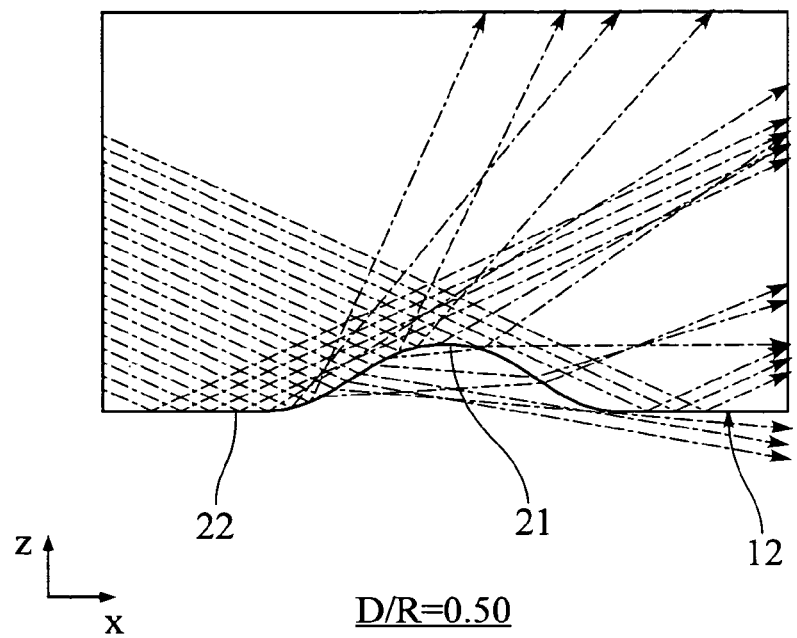
FIG. 13 shows simulation results of light reflection at an example of groove of the light guide member.
Figure 14:
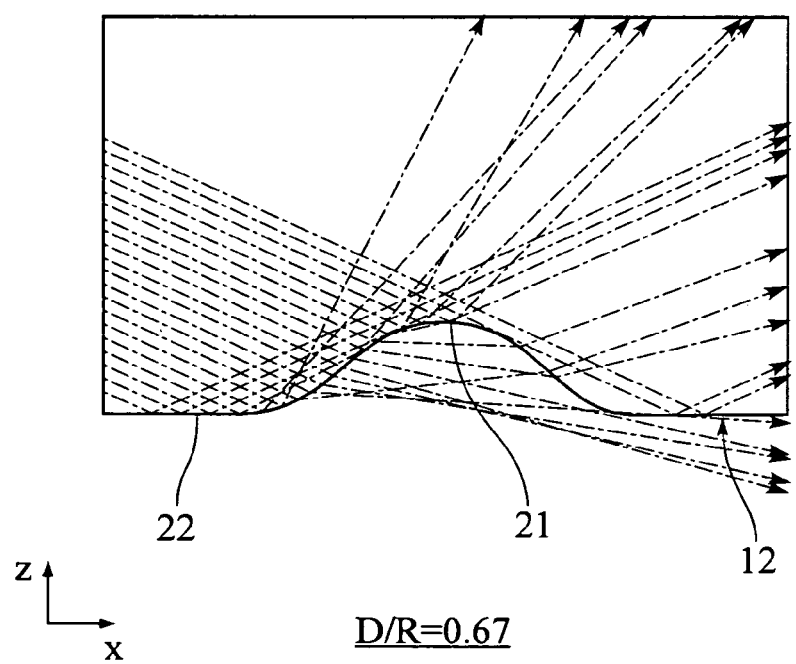
FIG. 14 shows simulation results of light reflection at a groove as a comparative example.

The provision of the grooves 21 in the light guide member 21 also contribute to the uniformity of the brightness of the linear light in the direction x. FIGS. 11-14 show the results of simulation of how light travels when the dimensions of the grooves 21 are changed. Specifically, FIGS. 11, 12 and 13 show the results when the ratios D/R are 0.17, 0.33 and 0.50, respectively, all of which are not greater than 0.5. FIG. 14 shows the result of a comparative example in which the ratio D/R of the groove 21 is 0.67. As shown in the figures, the greater the ratio D/R is, the larger proportion of the light traveling from the left side is reflected upward. This is because, when the ratio R/D is high, the left rising surface of the groove 21 is large.

However, when the rising surface increases due to an increase in the ratio D/R, a large amount of light passes through the surface to the lower right without being reflected. This is because, when the angle of the rising surface with respect to the direction x is excessively large, the angle of incidence of the light traveling from the left side is smaller than the critical angle. As a result of the simulation, it is found that, when the ratio D/R is not greater than 0.5, the proportion of light reflected is increased while the proportion of the light which passes through is suppressed. When the ratio D/R exceeds 0.5 as is in the comparative example, the proportion of the light reflected is not increased, while the proportion of the light which passes through is considerably large.

Since all the grooves 21 of the light guide member C1 satisfy D/R≦0.5, the light traveling from the light incident surface 11 is efficiently reflected. Thus, the brightness of the light emitted from the light emitting surface 13 is enhanced. Further, as shown in Table 1, except for some grooves, a groove 21 positioned farther from the light incident surface 11 has a greater D/R. Thus, even at the region which is far from the light incident surface 11 and where the light from the light source 9 is relatively weak, a large amount of light is reflected toward the light emitting surface 13 due to the existence of a groove 21 whose D/R is high. This arrangement is advantageous for achieving the uniformity of brightness of the light emitted from the light emitting surface 13 with respect to the direction x.

As shown in FIGS. 3 and 4, the LEDs 9B, 9G and 9R of the light source 9 are aligned in the direction z corresponding to the light emission direction of the light emitting surface 13. With this arrangement, the color of the light traveling within the light guide member C1 is prevented from becoming non-uniform in the direction y. As a result, the linear light emitted from the light emitting surface 13 is uniformly white.

The non-convex surface in the present invention is not limited to the round pillar surface 32. For instance, a planar surface or other kinds of surfaces may be employed as long as it does not converge light in the direction y. The shape of the non-convex surface as viewed in the direction z is not limited to an isosceles triangle but may be a parabola or a trapezoid, for example. To make the ratios D/R of the grooves 21 differ from each other in the direction x, the radii R may be differentiated while setting the depth D constant, instead of differentiating the depths D while setting the radius R constant.

The inclined surfaces 15a and 15b formed at the end of the light guide member C1 provide the following advantages.

The light emitted from the light source 9 travels within the light guide member C1 while being reflected by the light reflecting surface 12, the light emitting surface 13, the side surface 14a and the side surface 14b. Since the light is partially emitted from the light emitting surface 13 while it travels within the light guide member C1, the light is considerably attenuated before it reaches the end of the light guide member C1. Thus, almost all the light travels in the direction x at portions adjacent to the inclined surfaces 15a, 15b. The angle of incidence of the light traveling in the direction x with respect to the inclined surfaces 15a, 15b is 45 degrees. This light is totally reflected by the inclined surfaces 15a, 15b and does not pass through the surfaces to the outside of the light guide member C1.

As indicated by the arrows S of phantom lines in FIG. 9, the light traveling in the direction x and becoming incident on the inclined surface 15b at the angle of incidence of 45 degrees is totally reflected. The totally reflected light becomes incident on the inclined surface 15a at the angle of incidence of 45 degrees and is again totally reflected. In this way, the light traveling to the inclined surface 15b in the direction x is almost entirely returned into the light guide member C1 due to the total reflection at the inclined surface 15b and the inclined surface 15a. Similarly, the light becoming incident on the inclined surface 15a at the angle of incidence of 45 degrees is totally reflected at the inclined surface 15b to be returned into the light guide member C1. In this way, by the provision of the inclined surfaces 15a, 15b in the light guide member C1, light is prevented from leaking from the terminating end.

Moreover, part of the light totally reflected at the inclined surfaces 15a, 15b reaches the light emitting surface 13 at a portion adjacent to the end of the light guide member C1 directly or after the reflection at the light reflecting surface 12 or the side surfaces 14a, 14b. Part of the light reaching the light emitting surface 13 is emitted from the light emitting surface 13. Thus, the amount of the light emitted from the portion adjacent to the terminating end of the light guide member C1 is increased. In this way, since light is returned and used efficiently, it is not necessary to provide a reflection member or a reflection film at the end of the light guide member C1. Further, as the light source 9, a low-power light source, which is generally inexpensive, can be used.

Figure 15:
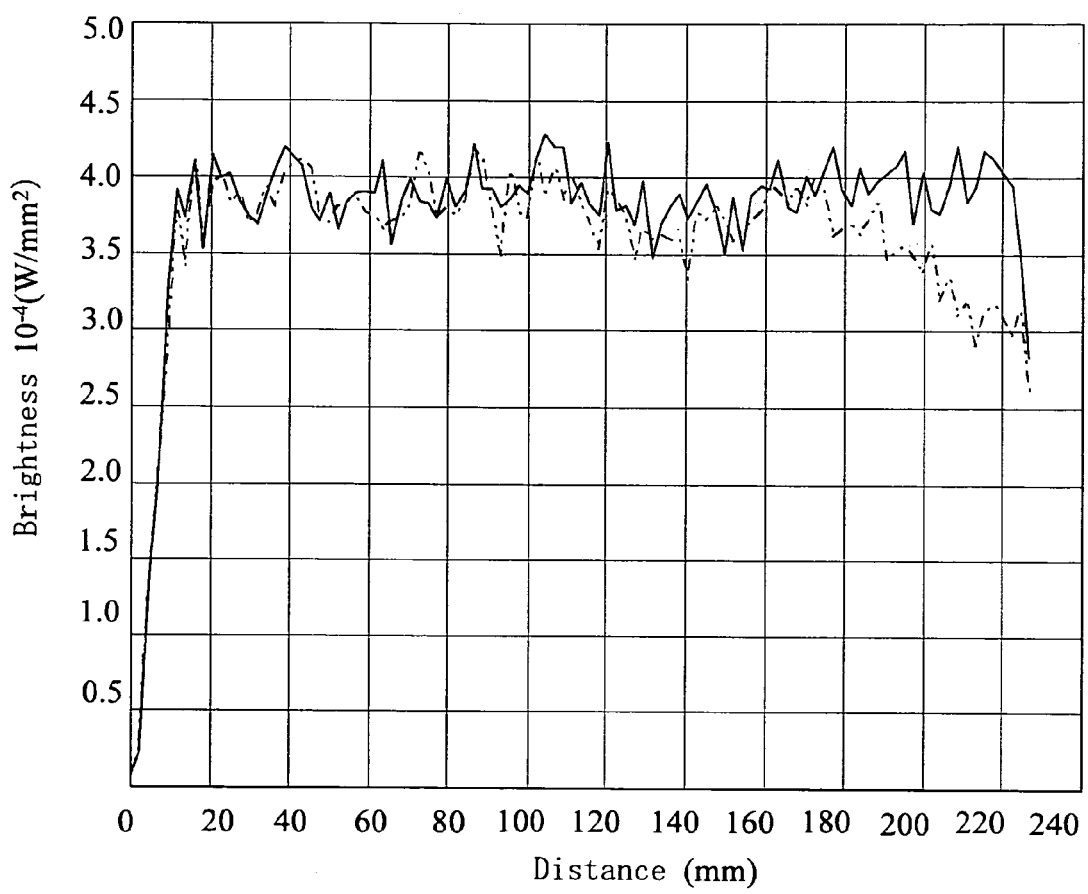
FIG. 15 is a graph showing the brightness distribution of linear light in a linear light source device.

FIG. 15 shows the relation between the distance of a position from the starting end of the light guide member A1 and the intensity of light emitted from the position. In FIG. 15, the solid line indicates the result of the light guide member C1, whereas the broken line indicates the result of a comparative example which does not include inclined surfaces 15a, 15b.

In FIG. 15, the axis of abscissa indicates the distance from the light incident surface 11 of the light guide member C1, whereas the axis of ordinate indicates the intensity of light. As shown in FIG. 15, the difference in intensity between the light guide member C1 and the comparative example is considerably large at the position which is farthest from the light source 9, i.e., adjacent to the end in the direction x. In this way, as compared with the comparative example, the light guide member C1 achieves stable light intensity at a portion adjacent to the end.

As shown in Table 1, in this embodiment, the ratios D/R of the grooves 21 with groove Nos. 201-228, which are close to the inclined surfaces 15a and 15b, are smaller than the ratios D/R of the grooves 21 with groove Nos. 181-200. With this arrangement, the brightness of the linear light is prevented from becoming excessively high at a portion adjacent to the inclined surfaces 15a, 15b due to the reflection at the inclined surfaces 15a, 15b.

Figure 16:
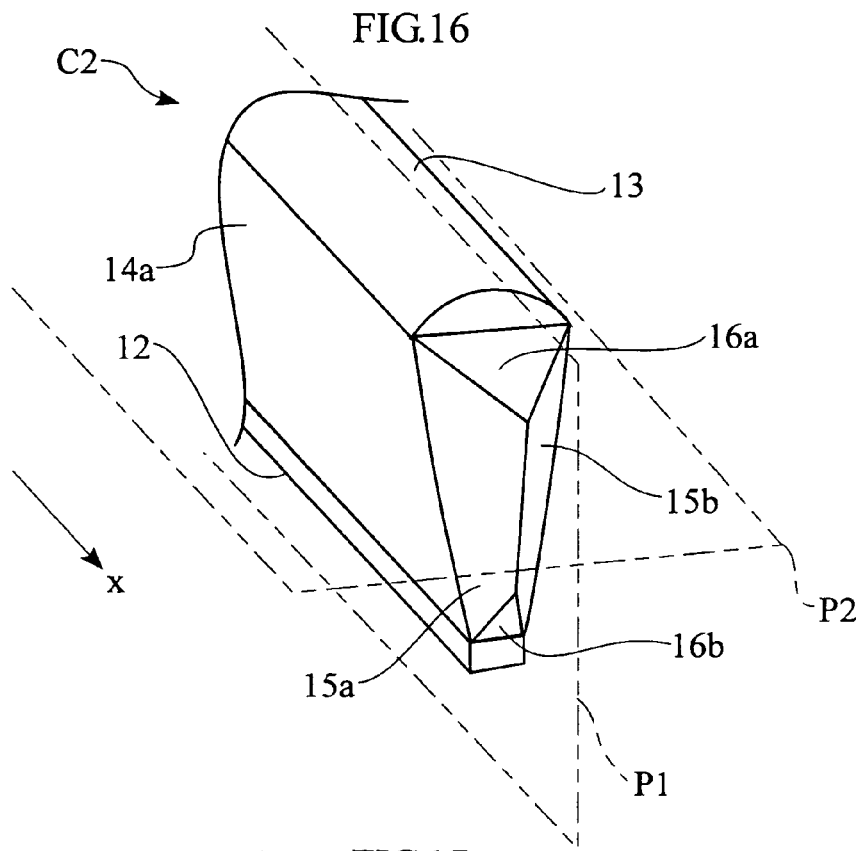
FIG. 16 is a perspective view showing an end of a light guide member according to a second embodiment of the present invention.

FIG. 16 is a perspective view showing an end of a light guide member according to a second embodiment of the present invention. Similarly to the light guide member C1, the light guide member C2 according to the second embodiment-includes a pair of inclined surfaces 15a and 15b. Further, the light guide member C2 includes another pair of inclined surfaces 16a and 16b. The inclined surface 16a is a plane defined by the upper edge of the inclined surface 15a, the upper edge of the inclined surface 15b and the body of the light guide member C2. Similarly, the inclined surface 16b is a plane defined by the lower edge of the inclined surface 15a, the lower edge of the inclined surface 15b and the body of the light guide member C2.

Similarly to the inclined surfaces 15a and 15b, the inclined surfaces 16a and 16b are mirror symmetrical with respect to the plane of symmetry P2 (see phantom lines in FIG. 16) The plane of symmetry P2 extends perpendicularly to the plane of symmetry P1. Since the upper portion and the lower portion of the light guide member C2 are not symmetrical, the inclined surfaces 16a and 16b do not have the same shape. The angle formed by the inclined surface 16a and the plane of symmetry P2 is 45 degrees. Similarly, the angle formed by the inclined surface 16b and the plane of symmetry P2 is 45 degrees.

In the light guide member C2, light is returned by the inclined surfaces 16a, 16b in addition to the inclined surfaces 15a, 15b. Thus, in the light guide member C2, the light traveling in the direction x is returned into the light guide member with higher efficiency than in the light guide member C1.

Figure 17:
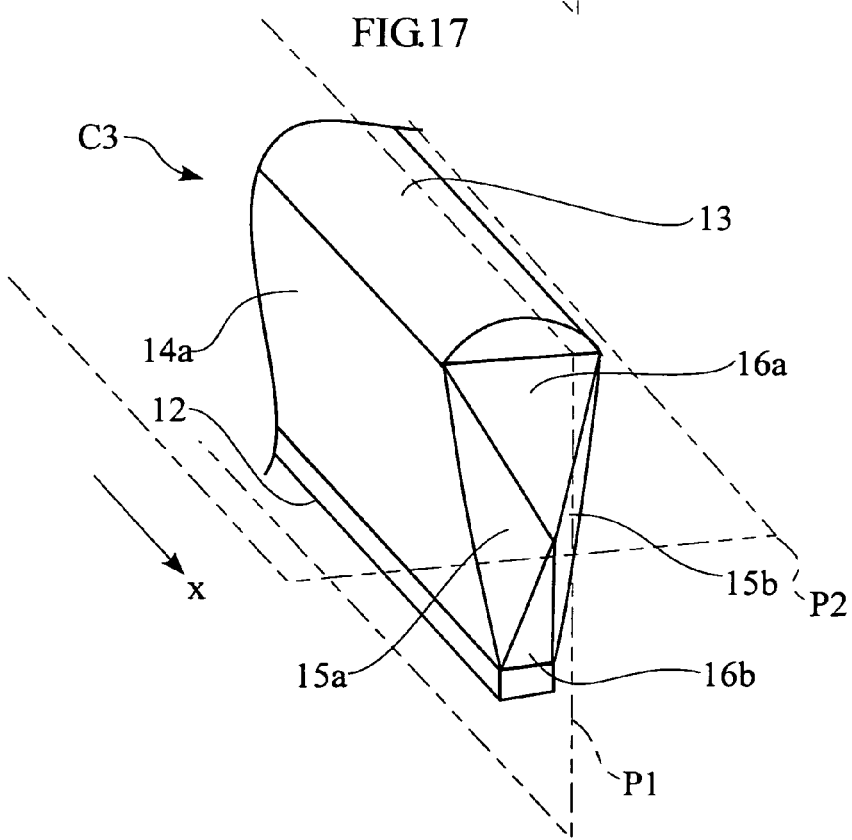
FIG. 17 is a perspective view showing an end of a light guide member according to a third embodiment of the present invention.

FIG. 17 is a perspective view showing an end of a light guide member according to a third embodiment of the present invention. Similarly to the light guide member C2, the end of the light guide member C3 according to the third embodiment is formed by four inclined surfaces 15a, 15b, 16a, 16b. Unlike the light guide member C2, the four inclined surfaces 15a, 15b, 16a, 16b of the light guide member C3 are triangles contacting each other at one vertex. The vertex at which the four inclined surfaces 15a, 15b, 16a, 16b contact each other is positioned on a straight line where the plane of symmetry P1 and the plane of symmetry P2 intersect each other. Each of the inclined surfaces 15a and 15b forms the angle of 45 degrees with respect to the plane of symmetry P1. With this structure, an appropriate angle is formed between each of the inclined surfaces 16a and 16b and the plane of symmetry P2.

Since the end of the light guide member C3 is formed by the four inclined surfaces 15a, 15b, 16a, 16b similarly to the light guide member C2, the light traveling in the direction x is efficiently returned into the light guide member C3. The angle formed by each of the inclined surfaces 16a, 16b and the plane of symmetry P2 is not 45 degrees which is the optimum angle for returning light. However, since the area of the inclined surfaces 16a, 16b is larger than that of the light guide member C2, the inclined surfaces 16a, 16b reflect a large amount of light.

Figure 18:
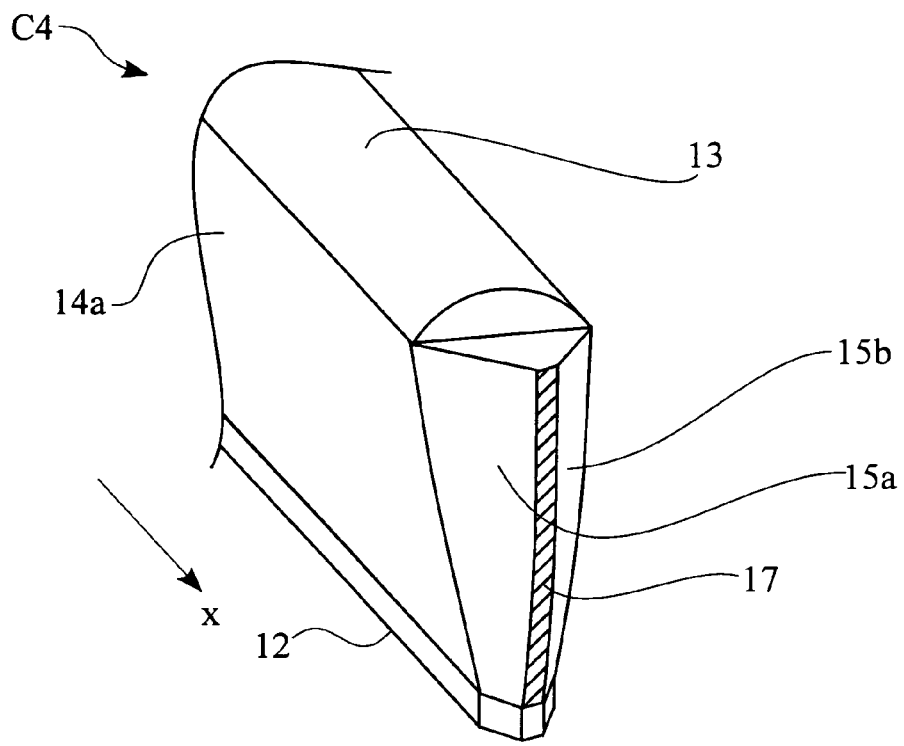
FIG. 18 is a perspective view showing an end of a light guide member according to a fourth embodiment of the present invention.

FIG. 18 is a perspective view showing an end of a light guide member according to a fourth embodiment of the present invention. The light guide member C4 of the fourth embodiment includes a grained surface 17 between the inclined surface 15a and the inclined surface 15b. The grained surface 17 is formed by roughening a surface extending between the inclined surfaces 15a and 15b perpendicularly to the direction x. The grained surface 17 can diffuse light traveling in the direction x.

When the inclined surfaces 15a and 15b are formed like those of the light guide member C1 (see FIG. 8), a small linear plane may be formed at the portion where the inclined surfaces 15a and 15b meet each other. Such a plane allows the light traveling in the direction x to pass therethrough and causes the loss of light. In the light guide member C4, a plane is intentionally formed between the inclined surfaces 15a and 15b, and the plane is grained to diffuse the light. Thus, the loss of light is prevented.

Figure 19:
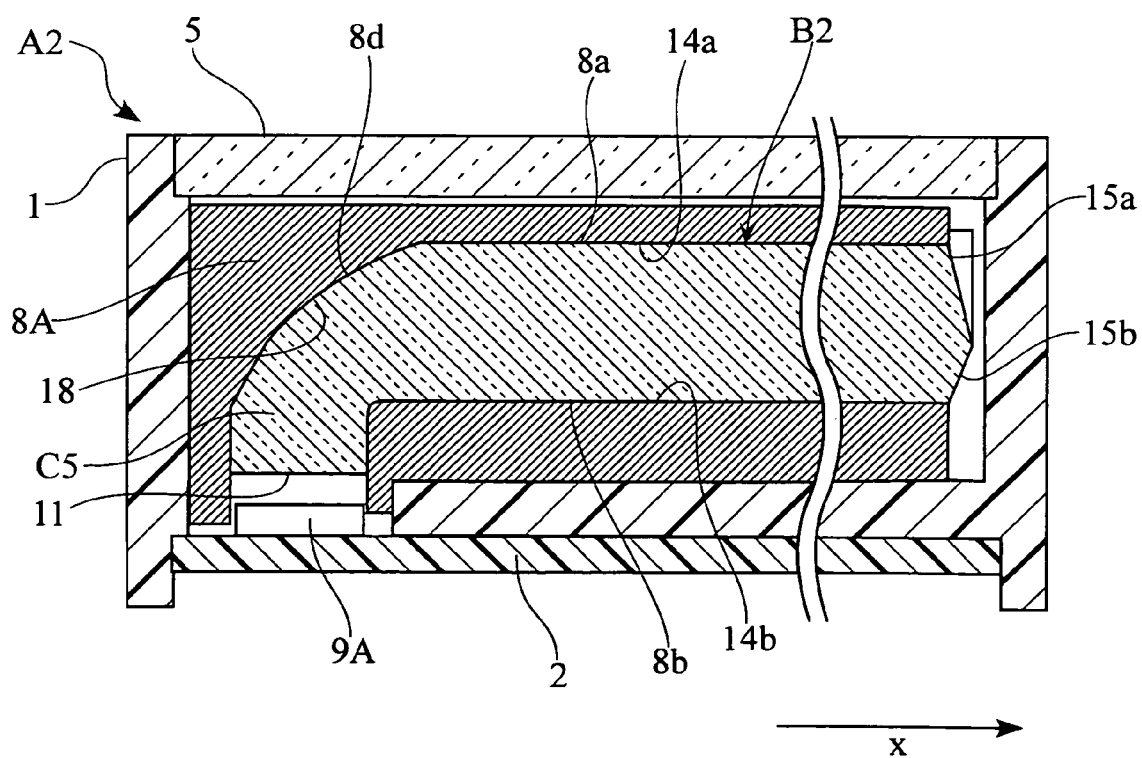
FIG. 19 is a sectional view showing an image reading apparatus provided with a linear light source device including a light guide member according to a fifth embodiment of the present invention.

FIG. 19 is a sectional view showing an image reading apparatus incorporating a linear light source device including a light guide member according to a fifth embodiment of the present invention. In FIG. 19, the elements which are identical or similar to those of the image reading apparatus shown in FIG. 2 are designated by the same reference signs as those used for FIG. 2.

In the linear light source device B2 of the image reading apparatus A2 according to the fifth embodiment, the light source 9A of the light guide member C2 is disposed on a substrate 2. The light emitting surface of the light source 9 is oriented upward. Accordingly, as shown in FIG. 19, an end of the light guide member C5 in the direction x is so bent that the light incident surface 11 faces the light emitting surface of the light source 9A.

The light guide member C5 includes an inclined surface 18 above the light incident surface 11. In the light guide member C5, the light entering through the light incident surface 11 is reflected at the inclined surface 18 to travel in the direction x. The reflection member 8A includes a reflecting surface 8d covering the inclined surface 18. The reflecting member 8A returns the light passing through the inclined surface 18 into the light guide member.

It is to be noted that any of the structures of the terminating end of the light guide members C1, C2, C3, C4 is applicable to the end of the light guide member C5.

Figure 20:
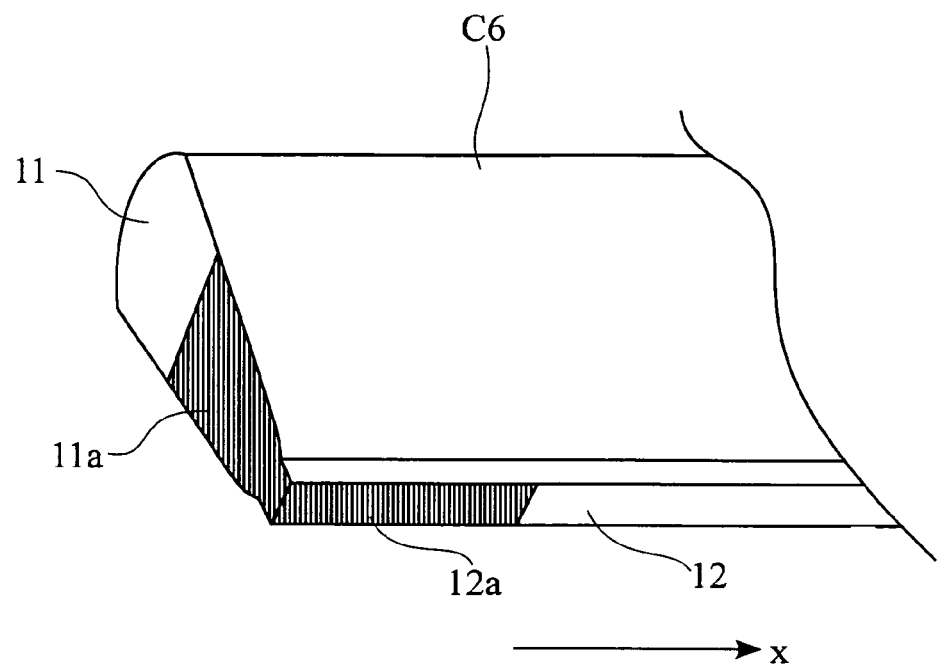
FIG. 20 is a perspective view of a light guide member according to a sixth embodiment of the preset invention as viewed from the side of the light incident surface.

FIG. 20 is a perspective view of a light guide member according to a sixth embodiment of the preset invention as viewed from the side of the light incident surface. In FIG. 20, the illustration of the light source 9 is omitted. In the light guide member C6 of the linear light source device B3 according to the sixth embodiment, the light incident surface 11 includes a rough surface 11a on the side to adjoin the light reflecting surface 12, as indicated by vertical lines in FIG. 20. The rough surface 11a may be formed by filing, for example. The surface roughness of the rough surface 11a corresponds to Grain Pattern AH0-949s or AH0-1003s of AYAMADAI Kabushiki Kaisha.

As indicated by vertical lines in FIG. 19, the light reflecting surface 12 includes a rough surface 12a on the side to adjoin the light incident surface 11. The rough surface 12a may be formed by filing, for example. The surface roughness of the rough surface 12a is substantially equal to that of the rough surface 11a.

The region other than the rough surface 12a of the light reflecting surface 12 is formed with a plurality of grooves 21 (see FIG. 3) arranged at a predetermined interval along the direction x of the light guide member C1. At the light reflecting surface 12, part of light is diffused by the grooves 21. The light diffusion is more likely to occur at the rough surface 12a than at other portions formed with the grooves 21.

Figure 21:
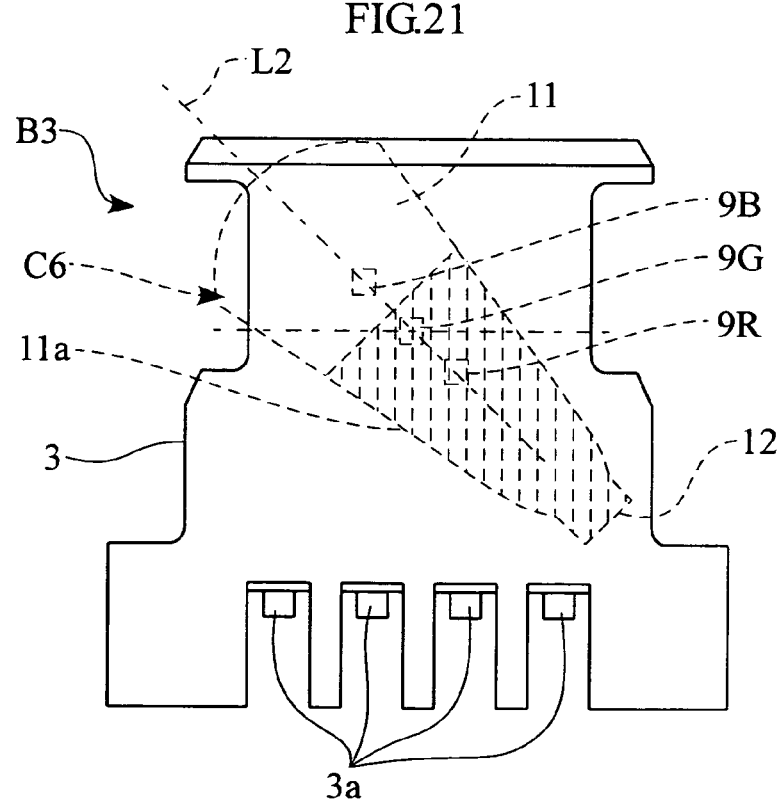
FIG. 21 shows the linear light source device as viewed from the light source side.

FIG. 21 shows the linear light source device as viewed from the light source side. As shown in FIG. 21, the LEDs 9B, 9G, 9R of the linear light source device B3 are arranged in the order of 9B, 9G, 9R from the upper left to the lower right along the straight line L2 (direction z). Specifically, the LEDs 9G and 9R are disposed to face the rough surface 11a (see vertical lines) of the light incident surface 11 of the light guide member C1. The LED 9B is disposed at a portion which does not face the rough surface.

The advantages of the linear light source device B3 will be described below.

To properly read a color document using the image reading apparatus C3 incorporating the linear light source device B3, each of the blue light, green light and red light to irradiate the document needs to be generally uniform throughout the entire length of the lead line L. Thus, the light guide member C6 needs to be so designed that the light from the three LEDs 9B, 9G, 9R become uniform throughout the entire length of the lead line L.

Generally, light with a longer wavelength has a lower index of refraction. The light with a longer wavelength is relatively unlikely to be diffused and has a relatively high directivity. For this reason, the LEDs of the light source 9 are arranged in the order of 9R, 9G, 9B from the side close to the light reflecting surface 12. Specifically, light with a longer wavelength is less likely to reach the light reflecting surface 12, which extends in parallel with the main light traveling direction. Thus, an LED which emits light with a longer wavelength is disposed closer to the light reflecting surface 12.

The rough surface 11a of the light incident surface 11 is formed to face the LEDs 9R and 9G. Thus, when the light emitted from the LEDs 9R and 9G enters the light guide member C1, the light is diffused at the rough surface 11a. Due to the diffusion at the rough surface 11a, a large proportion of the light emitted from the LEDs 9R and 9G reaches the light reflecting surface 12 at a portion adjacent to the light incident surface 11.

The rough surface 12a of the light reflecting surface 12 is formed adjacent to the light incident surface 11. The rough surface 12a diffuses the light traveling within the light guide member C1. Thus, part of the light traveling from the LEDs 9R and 9G to the rough surface 12a is diffused to reach a portion of the light emitting surface 13 which is close to the light incident surface 11. Specifically, the reflection by e.g. the reflection member 8 generally causes light to travel rightward in FIG. 20. However, the diffusion causes part of the light to travel leftward in FIG. 20. Blue light is originally likely to diffuse. Thus, although blue light is not caused to pass through the rough surface 11a, part of blue light reaches the rough surface 12a and then reaches a portion of the light emitting surface 13 which is close to the light incident surface 11.

As described above, in the light guide member C1, all of the blue light, green light and red light reach a portion of the light emitting surface 13 which is close to the light incident surface 11. As a result, each of the blue light, green light and red light can be emitted from the light emitting surface 13 of the light guide member C6 uniformly through the entire length in the direction x.

Figure 22:
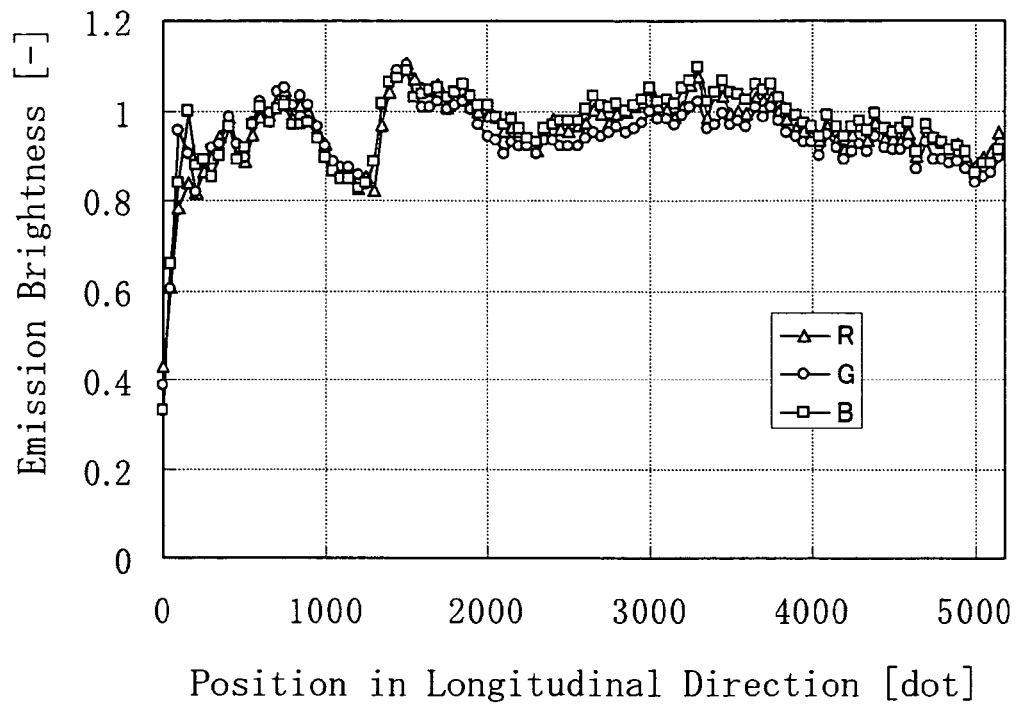
FIG. 22 shows the relation between the intensity of light and the position in the light emitting surface.
Figure 23:
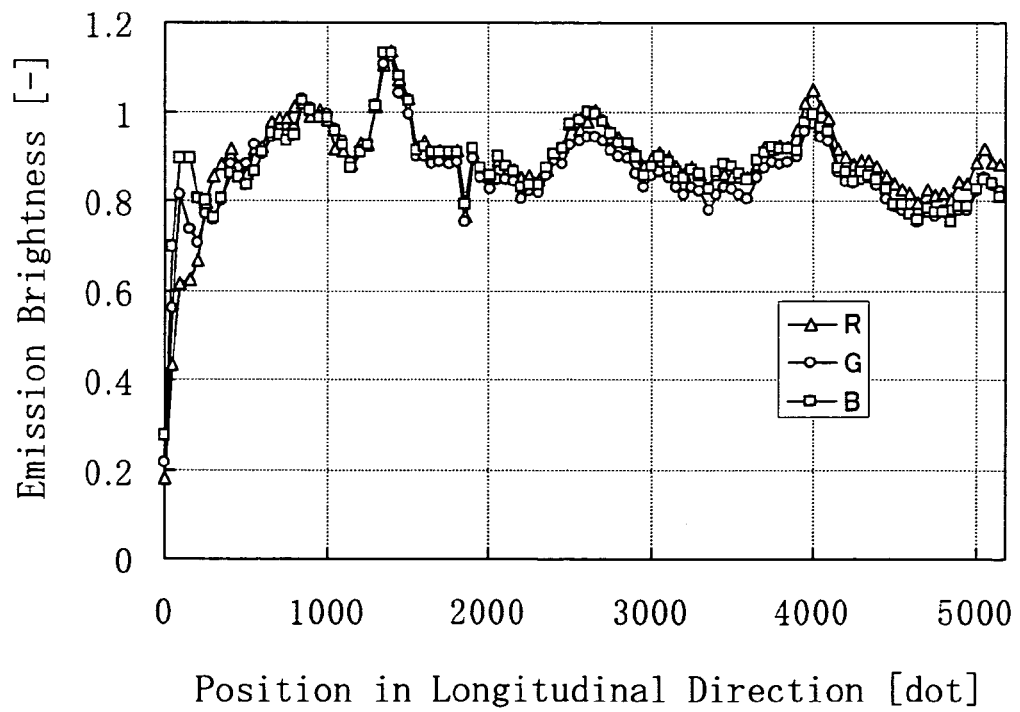
FIG. 23 shows the relation between the intensity of light and the position in the light emitting surface.
Figure 24:
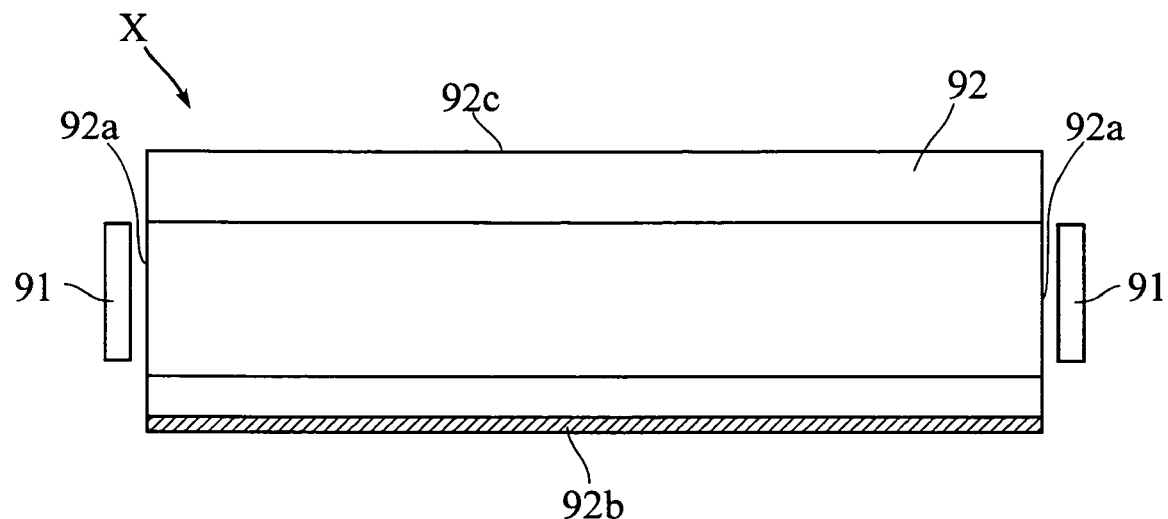
FIG. 24 is a front view showing a conventional linear light source device.
Figure 25:
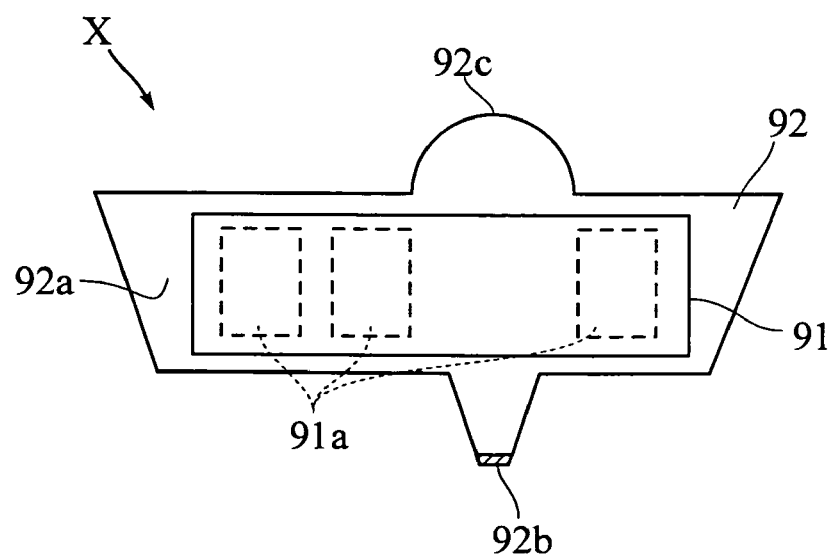
FIG. 25 is a side view showing the conventional linear light source device.

FIGS. 22 and 23 show the relation between the brightness of light and the position in the light emitting surface 13 in the direction x. FIG. 22 shows the result obtained when the light guide member C6 formed with the rough surfaces 11a and 12a is used. FIG. 23 shows the result obtained when the light guide member which is not formed with rough surfaces 11a, 12a is used. In FIGS. 22 and 23, each position in the light emitting surface in the direction x is represented by the dot number from the light incident surface 11 side.

As will be understood from FIGS. 22 and 23, as compared with the light guide member which is not formed with rough surfaces, the light guide member C6 formed with rough surfaces 11a and 12a exhibits a higher brightness of red light at positions close to 0 dot. This result indicates that the provision of rough surfaces 11a and 12a achieves uniform light emission from a wide area of the light emitting surface 13. As a result, it is possible to reduce the size of the light guide member C6 and hence to reduce the size of the image reading apparatus A3. Unlike the above-described structure, the rough surface 11a may be formed only at a region which faces the red light source. The rough surface 12a may be dispensed with.

The light guide member and linear light source device according to the present invention are not limited to the foregoing embodiments. The specific structure of each part of the light guide member and linear light source device according to the present invention may be varied in design in various ways.

The invention claimed is:

1. A light guide member made of a light transmitting material, the light guide member comprising:
    a light emitting surface extending in a first direction and including a convex surface for converging light in a second direction perpendicular to the first direction; and
    a light incident surface positioned at an end in the first direction;
    wherein the light emitting surface includes a transitional region adjacent to the light incident surface, the transitional region including said convex surface and a non-convex surface;
    wherein the convex surface becomes less dominant in the transitional region as proceeding in the first direction toward the light incident surface;
    wherein the light guide member includes another end in the first direction, said another end comprising a plurality of surfaces including a pair of inclined surfaces;
    wherein the paired inclined surfaces are mirror symmetrical with respect to a plane of symmetry extending in the first direction; and
    wherein a grained surface is provided between the paired inclined surfaces, the grained surface being perpendicular to the plane of symmetry.

2. The light guide member according to claim 1, wherein the non-convex surface is part of a surface of a column having a central axis extending in the second direction.

3. The light guide member according to claim 1, further comprising a plurality of grooves formed at a portion opposite to the light emitting surface, the grooves being spaced from each other in the first direction and each extending in the second direction.

4. The light guide member according to claim 3, wherein each of the grooves is a columnar groove with a central axis extending in the second direction and has a radius R and a depth D that satisfy $D/R \leq 0.5$.

5. The light guide member according to claim 4, wherein the plurality of grooves include two adjacent grooves that differ from each other in D/R, the D/R of one of the two adjacent grooves which is farther from the light incident surface being greater than the D/R of the other one of the two adjacent grooves which is closer to the light incident surface.

6. A linear light source device comprising:
    a light guide member as set forth in claim 1; and
    a light source facing the light incident surface.

7. The linear light source device according to claim 6, wherein the light source includes a plurality of LED elements; and
    wherein the LED elements are aligned along a light emission direction of the light emitting surface, the light emission direction extending perpendicularly to both the first direction and the second direction.

8. The linear light source device according to claim 7, wherein the LED elements emit light of different wavelengths; and
    wherein at least part of the light incident surface is a rough surface.

9. The linear light source device according to claim 8, wherein the rough surface of the light incident surface is provided at a portion opposite to the light emitting surface.

10. The linear light source device according to claim 9, wherein the LED elements include a blue LED element for blue light, a green LED element for green light and a red LED element for red light; and wherein the three LED elements are arranged in a manner such that the blue LED element, the green LED element and the red LED element become further in this order from the light emitting surface.

11. The linear light source device according to claim 10, wherein the rough surface in the light incident surface faces at least the red LED element.

12. The linear light source device according to claim 11, wherein the rough surface in the light incident surface further faces the green LED element.

13. The linear light source device according to claim 9, wherein the light guide member includes a surface opposite to the light emitting surface and provided with a rough portion adjacent to the light incident surface.

* * * * *